Figure 4:
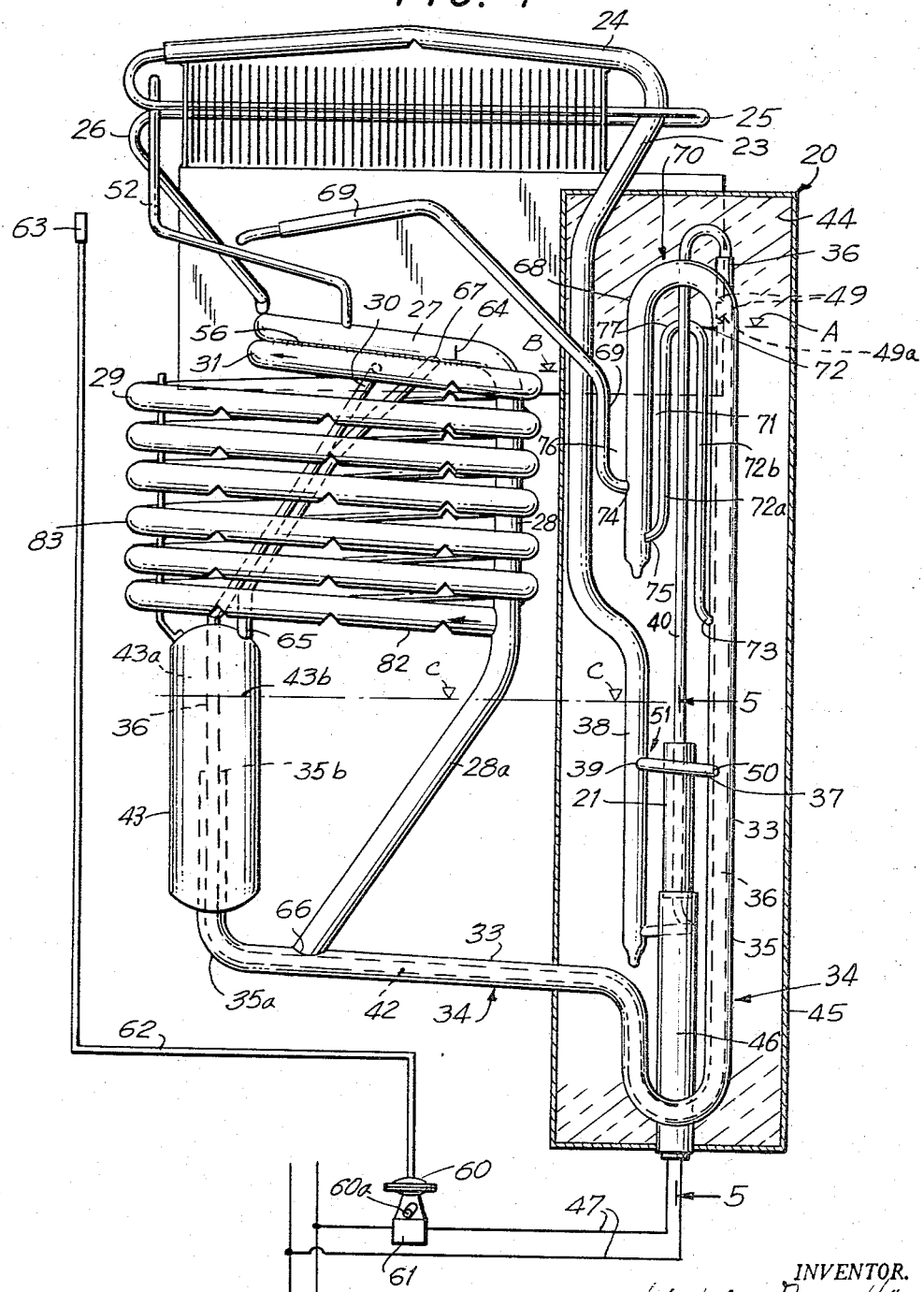

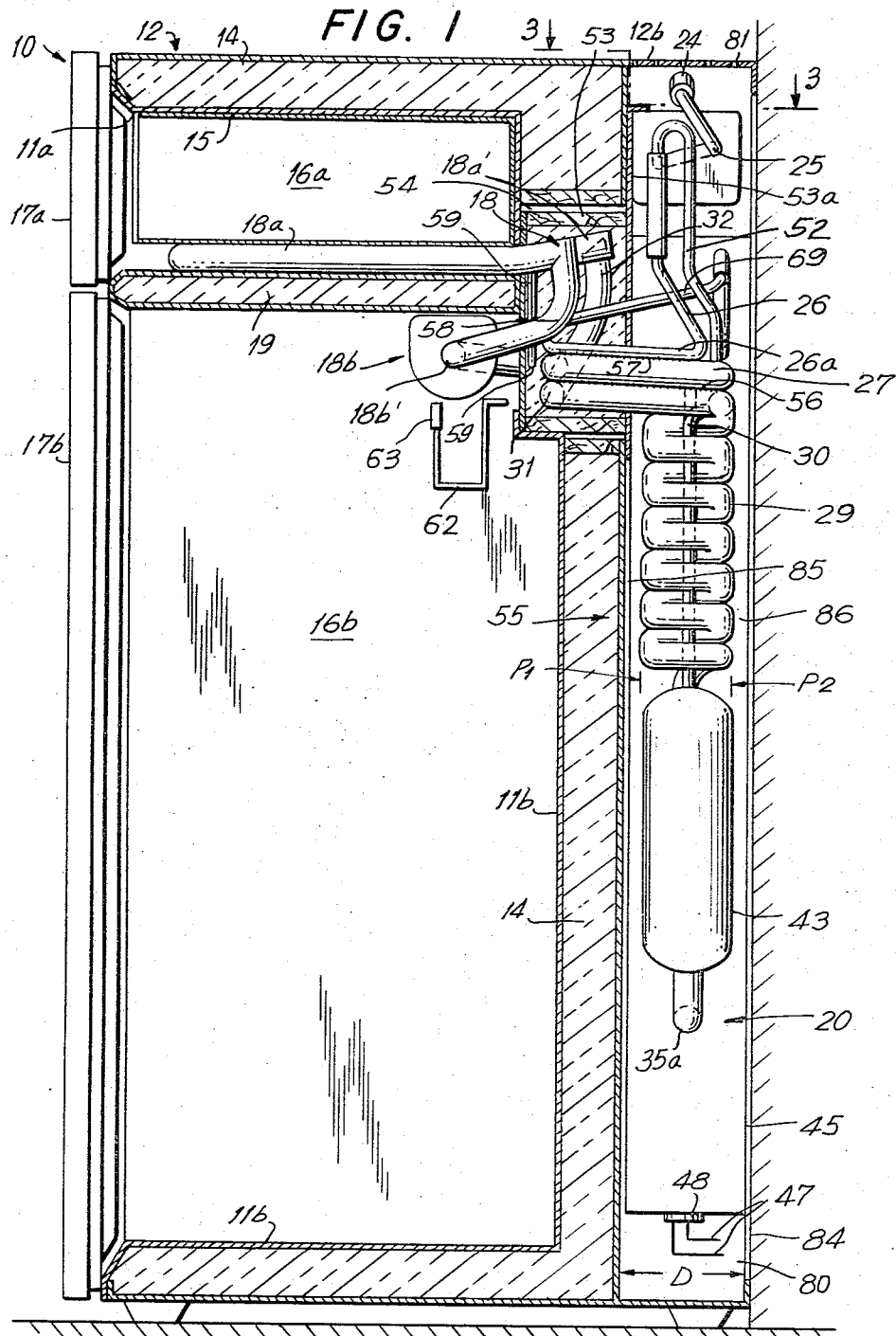

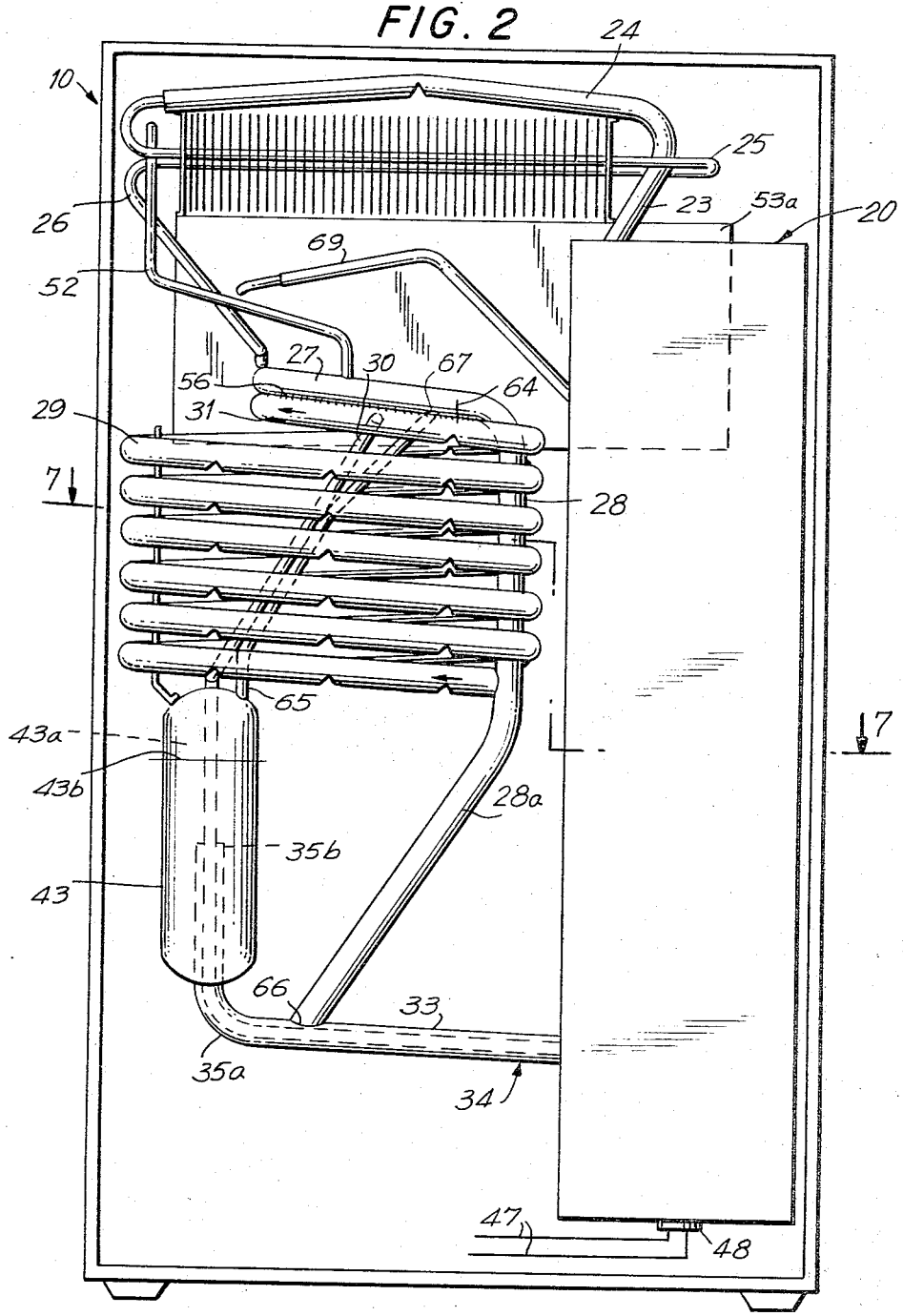

Aug. 29, 1967 W. G. KÖGEL 3,338,062
ABSORPTION REFRIGERATION SYSTEM OF THE INERT GAS TYPE
Filed Dec. 10, 1965 5 Sheets-Sheet 3
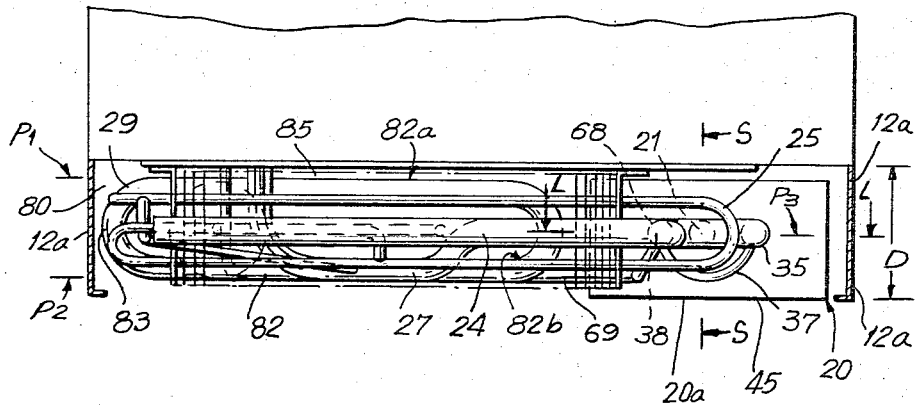
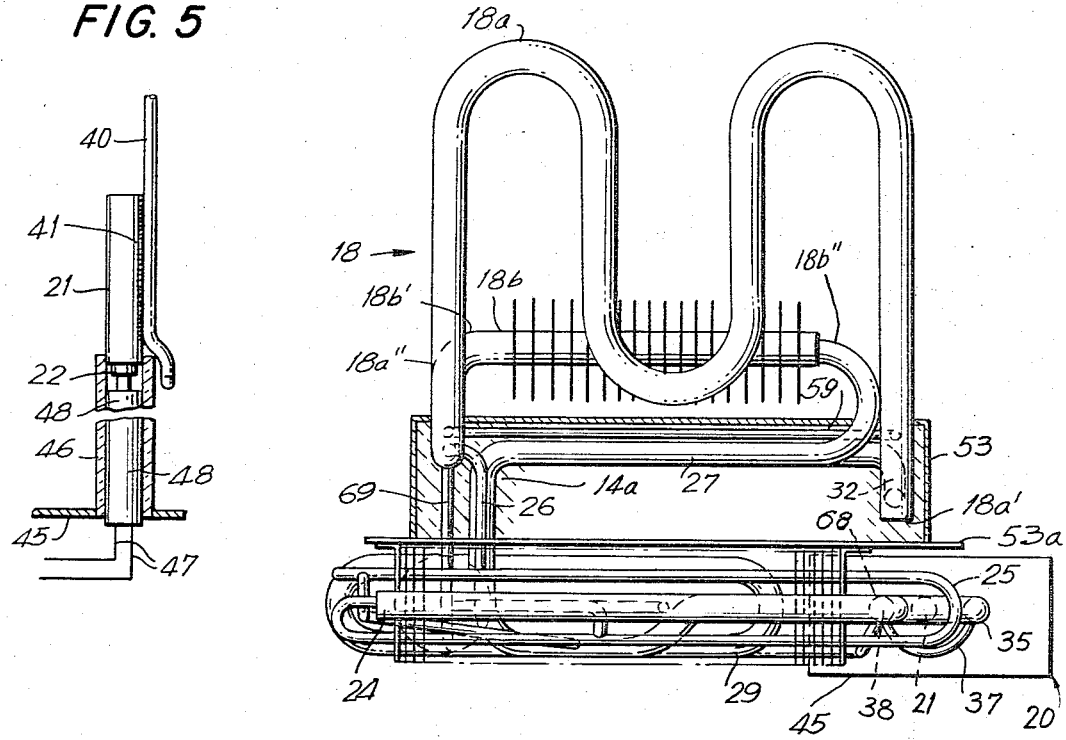
INVENTOR.
Wilhelm Georg Kögel
ATTORNEY

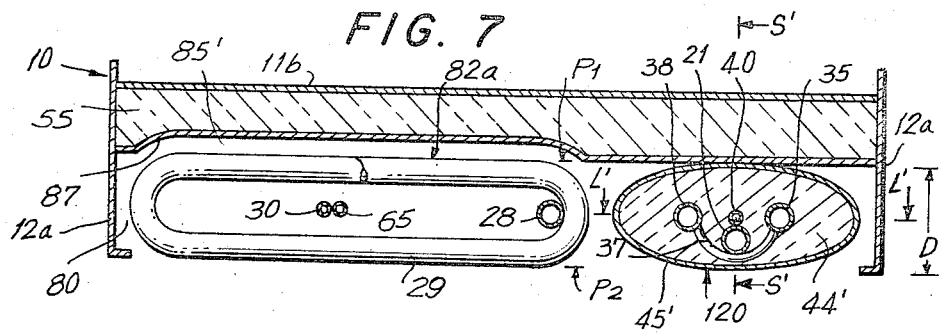
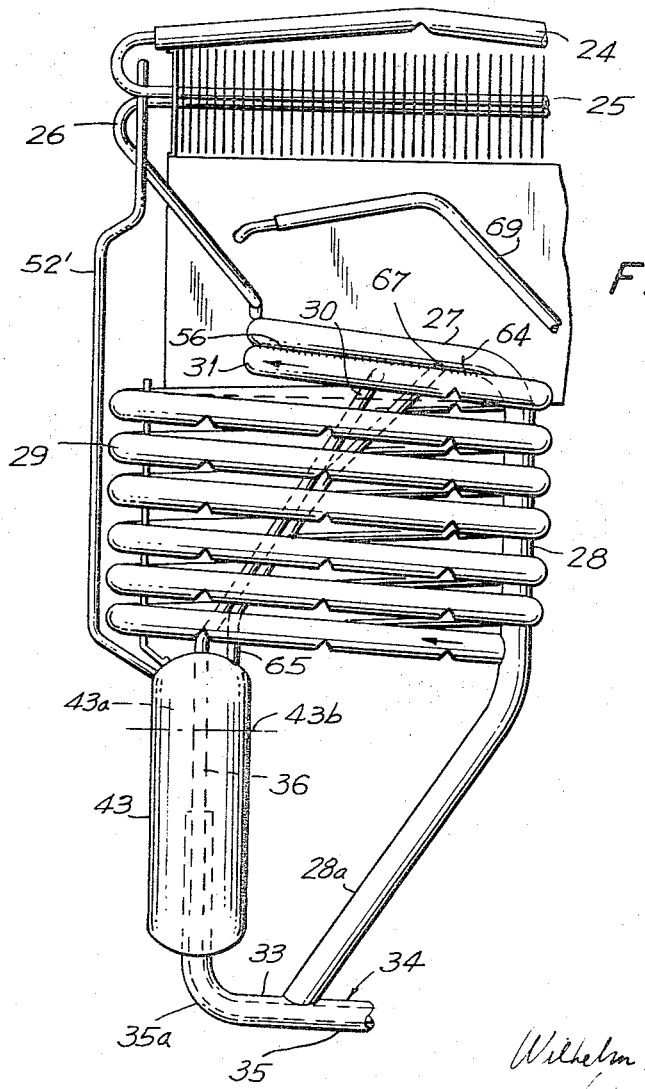

United States Patent Office 3,338,062
Patented Aug. 29, 1967

3,338,062
ABSORPTION REFRIGERATION SYSTEM OF THE INERT GAS TYPE
Wilhelm Georg Kögel, Stockholm, Sweden, assignor to Aktiebolaget Electrolux, Stockholm, Sweden, a corporation of Sweden
Filed Dec. 10, 1965, Ser. No. 512,914
Claims priority, application Sweden, Dec. 11, 1964, 15,057/64, 15,058/64
10 Claims. (Cl. 62—141)

My invention relates to an air-cooled absorption refrigeration system of the inert gas type.

It is an object of my invention to provide an improved air-cooled absorption refrigeration system of the inert gas type having a new arrangement and relationship of parts for adjusting the concentration of refrigerant in the absorption liquid circuit with change in ambient air temperature.

Another object is to provide an improvement of this kind in which the concentration of refrigerant in the absorption liquid circuit is adjusted by accumulating and storing liquid refrigerant under certain operating conditions, and by subsequently introducing such stored liquid refrigerant into the absorption liquid circuit in a controlled manner.

A further object is to provide an improvement of this kind in which a vessel functioning as a concentration vessel forms a dead-end branch of both the inert gas circuit and the absorption liquid circuit and is outside the active portions of both of these circuits.

A still further object is to provide a vessel of the above type which is in communication with the inert gas circuit at a single point and in communication with the absorption liquid circuit at a single point and in which normal flow of inert gas and absorption liquid is absent.

A still further object is to effect improvements in air-cooled absorption refrigeration apparatus of the inert gas type, particularly to provide a simple and compact arrangement of parts of the apparatus in a vertically extending space at the rear of a refrigerator cabinet of the household type in which the apparatus is incorporated.

A still further object is to provide an improvement of this kind having a compact arrangement of components of an absorption liquid circuit, especially the components of a generator which are thermally insulated from the surroundings, and air-cooled absorber coacting therewith, whereby the overall depth of the apparatus at the rear of the refrigerator cabinet will be at a minimum.

Further objects and advantages of my invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawing in which FIG. 1 is a side view, in section, of a household refrigerator embodying my invention; FIG. 2 is a rear elevational view of the refrigerator shown in FIG. 1; FIG. 3 is a fragmentary top view, taken at line 3—3 of FIG. 1, of the refrigerator shown in FIGS. 1 and 2; FIG. 4 is a view, apart from the refrigerator cabinet, of a refrigeration system like that shown in FIG. 2 with parts thereof broken away and in section to illustrate details more clearly; FIG. 5 is a fragmentary sectional view taken at line 5—5 of FIG. 4; FIG. 6 is a top plan view, apart from the refrigerator cabinet, of the refrigeration system shown in FIGS. 1 and 4 and the portion of the rear insulated wall forming a unitary part thereof; FIG. 7 is a sectional view taken at line 7—7 of FIG. 2 illustrating a modification of the invention; and FIG. 8 is a fragmentary view of parts similar to those shown in the refrigerating system of FIGS. 2 and 4 illustrating another modification of the invention.

Referring to FIGS. 1 and 2, I have shown my invention in connection with a household refrigerator comprising a cabinet 10 having top and bottom inner liners 11a and 11b arranged to be supported within an outer shell 12 and insulated therefrom at 14 in any suitable manner. Within the top inner liner 11a is disposed a metal shell 15 which defines a thermally insulated freezer space 16a, and the bottom inner liner 11b defines a food storage space 16b for storing food at a higher temperature than in the space 16a and preferably at a temperature above 32° F. Access to the spaces 16a and 16b is afforded at front openings which are adapted to be closed by insulated doors 17a and 17b hinged in any suitable manner (not shown) at the front of the refrigerator cabinet 10.

The freezer space 16a is arranged to be cooled by an evaporator section 18a in the form of a horizontally disposed coil having portions thereof in good thermal contact with the bottom of the metal shell 15. The food storage space 16b, which is separated from the freezer space 16a by a horizontal insulated partition 19, is arranged to be cooled by an evaporator section 18b below which a drip tray (not shown) may be supported in any suitable manner.

The evaporator sections 18a and 18b form low and higher temperature sections of a cooling unit 18 of a hermetically sealed absorption refrigeration system of the inert gas type. A refrigeration system of this type comprises a generator 20 containing a refrigerant, such as ammonia, in solution in a body of absorption liquid, such as water. As shown in FIGS. 4 and 5, heat is supplied to the generator 20 from a heating tube 21 which may be heated by an electrical heating element 22, for example, which is disposed within the tube. The heat supplied to the generator 20 and absorption solution therein expels refrigerant vapor out of solution, and, in a manner to be described hereinafter, refrigerant vapor passes upward from the generator through a vapor supply line or conduit 23 and an air-cooled rectifier 24 into an air-cooled condenser 25 in the form of a coil having fins fixed thereto. Refrigerant vapor is liquefied in the condenser 25 by surrounding cool air which flows in physical contact therewith, and the liquefied refrigerant flows through a conduit 26 into the cooling unit 18 in which it evaporates and diffuses into an inert pressure equalizing gas, such as hydrogen, which enters through a conduit 32. Due to evaporation of refrigerant fluid into inert gas in cooling unit 18, a refrigerating effect is produced with consequent absorption of heat from the surroundings.

The rich gas mixture of refrigerant and inert gas formed in cooling unit 18 flows from the lower evaporator section 18b thereof through conduits 27 and 28 into the lower end of an air-cooled absorber in the form of a looped coil 29. In absorber coil 29 the rich gas mixture flows counter-current to downwardly flowing absorption liquid which enters through a conduit 30. The absorption liquid absorbs refrigerant vapor from inert gas, and inert gas weak in refrigerant flows from absorber coil 29 in a path of flow including conduits 31 and 32 into the upper evaporator section 18a of cooling unit 18. During operation of the refrigeration system, heat is liberated in the absorber 29 due to absorption of refrigerant vapor into absorption liquid. Such heat of absorption is given up to surrounding cool air which flows in physical contact with the absorber 29, its temperature being determined by the temperature of the cooling air flowing in heat exchange relation therewith. It will now be understood that the absorber 29 comprises piping providing an elongated path of flow for absorption solution having an inlet at one level at the upper end of conduit 30 and an outlet at a lower level at the upper end of conduit 28a, whereby absorption solution flows by gravity through the absorber piping which forms the primary region in which refrigerant vapor is absorbed into solution during normal operation of the refrigeration apparatus.

The circulation of gas in the gas circuit just described is due to the difference in specific weight of the columns of gas rich and weak, respectively, in refrigerant vapor. Since the column of gas rich in refrigerant vapor and flowing from cooling unit 18 to the absorber coil 29 is heavier than the column of gas weak in refrigerant and flowing from the absorber coil 29 to cooling unit 18, a force is produced or developed within the system for causing circulation of inert gas in the manner described.

Enriched absorption liquid or absorption solution flows from the lower end of the absorber coil 29 through a conduit section 28a which depends downward from conduit 28, an outer passage 33 of a liquid heat exchanger 34 which includes an outer vertical pipe 35 and an inner vertical pipe 36 disposed within the generator 20. Enriched absorption liquid flows from the passage 33 through an upwardly inclined connection 37 into a vertical standpipe 38. The upper end of the inclined connection 37 is connected to the pipe 38 at a point 39 which is at a level below the liquid surface level of the column of liquid held in the pipe 38.

The extreme lower end of the pipe 38 is connected to the lower end of a pump pipe or vapor lift tube 40 in thermal exchange relation with the heating tube 21 at 41, as by welding, for example. Liquid is raised by vaporlift action through the tube or pump pipe 40 into the upper part of the pipe 36.

The absorption liquid from which refrigerant vapor has been expelled flows downward through the inner pipe 36, the latter extending through the liquid heat exchanger 34 and forming an inner passage 42 thereof. The pipe 36 extends upward through a vessel 43. At the upper end of the vessel 43 the pipe 36 is connected to the conduit 30 through which weak absorption liquid is introduced into the upper end of the absorber coil 29. The circulation of absorption solution in the liquid circuit just described is effected by raising of liquid through the pump pipe 40 from a low level to a higher level A in pipe 36, as shown in FIG. 4. Absorption liquid flows by gravity from level A in the generator 20 and passes from the upper end of conduit 30 into the upper end of the absorber coil 29 at the level B. The quantity of liquid held in the pipe 36 between the levels A and B represents the static pressure head required to overcome the resistance offered to flow of liquid from the pipe 36 in the generator 20 to the upper end of the absorber coil 29.

The generator 20, together with a part of the liquid heat exchanger 34, are embedded in a body of insulating material 44 retained in a metal shell or casing 45 having an opening at the bottom thereof. The electrical heating element 22 is arranged to be positioned within the heating tube 21 through a hollow sleeve member 46 which is formed of insulating material and extends downward from the bottom of the heating tube 21 to the bottom opening in the shell 45. Electrical conductors 47 for the electrical heating element 22 extend through one or more apertured insulating members 48 held in the hollow sleeve 46. The heating tube 21 snugly receives the heating element 22 which may comprise a cartridge having an electrical wire or the like having a relatively high resistance that generates heat when connected to a source of electrical energy.

In the operation of the refrigeration system of FIG. 4, vapor generated in the vapor lift pipe 40 flows from the upper end thereof into the extreme upper end of the standpipe 36 and passes through openings 49 in the side wall thereof into the outer passage 33 formed between the inner and outer standpipes 36 and 35, respectively. The vapor in the passage 33 depresses the liquid level therein to a point 50 and flows through enriched absorption liquid in an analyzer 51 which includes the upwardly inclined connection 37 and top part of the liquid column in the pipe 38. The generated vapor from the passage 33 flows through liquid in the analyzer 51 by bubble action. In bubbling through the enriched solution, absorption liquid vapor accompanying refrigerant vapor is cooled sufficiently and condenses and in this way is removed from refrigerant vapor. The refrigerant vapor flowing from the analyzer 51 passes through the upper part of the standpipe 38 and vapor supply line 23 to the condenser 25, as previously explained. The outlet end of the condenser 25 is connected by a conduit 52 to a part of the gas circuit, as to the conduit 27, for example, so that any inert gas which may pass through the condenser 25 can flow to the gas circuit.

As best shown in FIGS. 1, 4 and 6, the conduits 27 and 31 are U-shaped and have closed ends seen in FIG. 1 and pairs of spaced arms or legs, one pair of which is disposed within a body of insulation 14a retained in a removable wall section 53 to facilitate the insertion of the cooling unit 18 within the cabinet 10, such removable wall section 53 having an outer rectangular sheet 53a which overlaps the opening 54 in which the removable wall section 53 fits and is secured in any suitable manner (not shown) to the outer surface of the rear insulated wall 55 of the cabinet 10.

The U-shaped conduit 27 is disposed above the U-shaped conduit 31 and heat conductively connected thereto at 56, as by welding, for example, to form a gas heat exchanger for flowing gas rich and weak in refrigerant, respectively, in heat exchange relation. Further, the conduit 26 through which liquid refrigerant is supplied to the cooling unit 18 from the condenser 25 includes a part 26a which is heat conductively connected at 57 to the top conduit 27, as by welding, for example, as shown in FIG. 1.

Gas weak in refrigerant flows through conduits 31 and 32 to one end 18a' of the low temperature evaporator section 18a and flows through the latter to the opposite end 18a'' thereof. Liquid refrigerant flows from the conduit 26 to the end 18a'' of the low temperature evaporator section 18a and flows by gravity therethrough, the refrigerant flowing counter-current to the inert gas in the evaporator section 18a. Inert gas flows from the end 18a'' of the low temperature evaporator section 18a through a downwardly sloping connection 58 to one end 18b' of the higher temperature evaporator section 18b for flow therethrough. Liquid refrigerant flows through a conduit 59 from the end 18a' of the low temperature evaporator section 18a to the connection 58 for gravity flow through the higher temperature evaporator section 18b in parallel flow with the inert gas.

A control device 60 is operatively associated with a switch 61 connected in one of the conductors 47 for supplying electrical energy to heating element 22. The control device 60 is thermostatically controlled and is provided with a capillary tube 62 and thermal sensitive bulb 63 adapted to contain a suitable volatile fluid, the bulb 63 being arranged to be influenced by the temperature of air in the space 16b which is cooled by the higher temperature evaporator section 18b. The control device 60 functions to control switch 61 responsive to a temperature condition affected by the higher temperature section 18b of the cooling unit 18 and may be provided with a control knob 60a to adjust the temperature at which it is desired to maintain the higher temperature evaporator section 18b.

The hermetically sealed refrigerating system embodies provisions for adjusting the concentration of refrigerant in the absorption liquid circuit by accumulating and storing liquid refrigerant under certain operating conditions, and by subsequently introducing such stored liquid refrigerant into the absorption liquid circuit in a controlled manner. This is accomplished by providing the upright vessel 43 which functions as a concentration vessel in which is stored unevaporated refrigerant passing from the cooling unit 18. Such excess or unevaporated refrigerant passes from the end 18b" of the higher temperature evaporator section 18b and flows along the bottom of conduit 27 and is diverted therefrom by a wall or barrier 64 into a conduit 65 for downward flow therein. Liquid refrigerant passes from the lower end of conduit 65 into the vapor space 43a of the vessel 43, that is, above the liquid surface level 43b therein.

As explained above, absorption liquid enriched in refrigerant passes from the lower end of the absorber coil 29 through conduit section 28a into the outer passage 33 of the liquid heat exchanger 34 and flows through the latter to the generator 20. The pipe 35 includes a portion or section 35a which extends upward from the lower end of the conduit section 28a into the bottom part of the vessel 43, its upper free or open end 35b being in communication with the body of liquid in the vessel below its liquid surface level 43b. While the vessel 43 is in communication with the absorption liquid circuit at the single point 66, it forms a dead-end branch of the circuit which is outside the active portion of the liquid circuit and in which normal flow of absorption liquid is absent. The absorption liquid is stored in the vessel 43 to the level 43b therein in which is essentially the same as the liquid surface levels C of the columns of liquid maintained in the conduit section 28a and the pipe 38, the columns of liquid in the vessel 43 and the conduit section 28a being in free communication with one another below the liquid surfaces therein.

Since the vapor space 43a of the vessel 43 is in communication with the inert gas circuit only at the single point 67 at which the upper end of conduit 65 is connected to the conduit 27, the vapor space 43a in the vessel 43 essentially forms a dead-end branch for the gas mixture therein and forms an inactive part of the gas circuit in which active circulation of gas is avoided. With this arrangement, the concentration of refrigerant in the top layer of liquid in the vessel 43 will increase to a value materially greater than the concentration of refrigerant in the absorption liquid passing from the lower end of the absorber coil 29 and flowing to the lift pump 40 through the conduit section 28a and outer passage 33 of the liquid heat exchanger 34.

Stored liquid refrigerant in the vessel 43 is positively introduced into the active portion of the absorption liquid circuit through the pipe section 35a in a controlled manner by redistributing the absorption liquid in its circuit and increasing the quantity of such liquid held in the vessel 43. The quantity of liquid held in vessel 43 is increased when the heat supply to the generator 20 is reduced to render the vapor lift pump 40 inactive, thereby terminating the raising of absorption liquid to the level A. Under these conditions, normal circulation of liquid in the absorption liquid circuit stops and the quantity of liquid held in standpipe 36 between the levels A and B passes into the upper end of the absorber coil 29 from conduit 30. When the pump 40 becomes inactive, some liquid is, therefore, transferred from generator 20 to absorber coil 29 and passes to conduit section 28a, from the lower end of which liquid flows through pipe section 35a into vessel 43 and collects therein. Also, liquid contained in the absorber coil 29 and wetting its inner wall surfaces will flow downward into the conduit section 28a, thereby causing additional liquid to flow from such conduit section into the vessel 43.

Let us assume that an air-cooled refrigeration system like that shown and just described is charged with ammonia, hydrogen and water, so that the system will operate in a satisfactory manner in a normal temperature range of about 68° to 70° F. When the circulation pump 40 in the absorption liquid circuit is in operation, an equilibrium condition is established in which absorption liquid flows at a certain rate into the conduit section 28a and is withdrawn therefrom to the generator 20 at essentially the same rate, and the liquid surface levels in the conduit section 28a and vessel 43 are practically constant. Under these conditions the liquid column in conduit section 28a balances the liquid column in vessel 43 and pipe section 35a, the gas pressures acting on the liquid surfaces of the liquid bodies in conduit section 28a and vessel 43 being the same since the upper end of conduit 30 is in communication with the upper end of conduit 28 at the point 67.

Active circulation of absorption liquid only takes place through conduit section 28a during normal operation, and the pipe section 35a and vessel 43 essentially constitute a dead-end branch for absorption liquid in which the liquid body is more or less stagnant. In such normal operation of the system, the thermostatic control will be operable to shut off the heat supply to the generator 20 when the evaporator section 18b of cooling unit 18 reaches a predetermined low temperature, and substantially all of the liquid refrigerant will be evaporated in the cooling unit 18.

Let us now assume that the ambient air temperature increases upwards to about 95° to 100° F., so that the heat of absorption produced in the absorber coil 29 under the new operating conditions will not be effectively given up to the ambient air flowing in thermal relation therewith. Under such conditions, refrigerant vapor will not be effectively absorbed into absorption liquid in the absorber coil 29, and inert gas will flow to cooling unit 18 having an abnormally high concentration of refrigerant vapor, so that the cooling unit 18 will not be capable of producing the desired low refrigerating temperature for which the thermostatic control is adjusted. Under these assumed conditions, the thermostatic control will function to continue the heat supply to the generator 20. By reason of the abnormally high partial pressure of refrigerant vapor in the inert gas introduced into the cooling unit 18, all of the liquid refrigerant supplied to the cooling unit will not be evaporated therein, and the excess unevaporated refrigerant passing from the cooling unit 18 will flow to the vessel 43 in which it is accumulated and stored.

By storing unevaporated liquid refrigerant in vessel 43, such refrigerant in effect is withheld or withdrawn from the absorption liquid circuit; and the concentration of refrigerant in the absorption liquid eventually will be reduced adequately, so that absorption liquid having a sufficiently low concentration of refrigerant will be supplied to absorber coil 29 from generator 20. This will enable the absorber to function properly even at the higher ambient air temperature, thereby enabling the absorber to supply inert gas to cooling unit 18 which will be sufficiently poor in refrigerant vapor to cause substantially all of the liquid refrigerant to evaporate in the cooling unit 18.

When the ambient air temperature decreases from the high value assumed above and begins to approach the normal temperature range, it is highly desirable to increase the concentration of refrigerant in the absoprtion liquid as soon as possible. This is so because, in the lower or normal temperature range, such increase in concentration of refrigerant in the absorption liquid makes it possible to operate the generator 20 at a lower temperature, which means that the radiation losses will be reduced, the generator can be operated with less heat input, and the rectification losses will be decreased.

Such decrease in ambient air temperature to the normal temperature range may occur during the nighttime, for example, which in turn reduces the load on the refrigeration system. Under these conditions, the temperature of cooling unit 18 also will decrease; and, when the evaporator section 18b thereof reaches the predetermined low temperature referred to above, the thermostatic control will be operable to shut off the heat supply to the generator 20. This will interrupt the normal circulation of absorption liquid and cause liquid to be transferred to the conduit section 28a from other parts of the system. By reason of the free liquid communication between the conduit section 28a and the vessel 43, absorption liquid flows from the lower end of conduit section 28a through pipe section 35a into vessel 43 when absorption liquid is transferred to the conduit section 28a.

After an interval of time, the temperature of evaporator section 18b will rise sufficiently to cause the thermostatic control to function and start the heat supply to the generator 20, at which time pump 40 becomes active. Liquid will now be withdrawn from vessel 43 by the pump 40, although it should be understood that normal circulation of absorption liquid in this vessel usually is absent. After the pump 40 starts raising liquid into the upper end of standpipe 36, an interval of time will pass before absorption liquid again flows into the conduit section 28a. Hence, the entire quantity of liquid held in the vessel 43 will be reduced to an extent corresponding to the accumulation of liquid in the vessel 43 when the normal circulation of absorption liquid is reduced and liquid in the absorption liquid circuit is transferred to the conduit section 28a.

When the new pumping period commences, the part of standpipe 36 between the levels A and B is depleted of liquid; and the absorber coil 29 can accumulate a comparatively large amount of liquid at its inner wall surfaces, due to the action of capillary and adhesive forces, before a stream of liquid passes through the entire length of the absorber coil. In view of the manner in which normal circulation of absorption liquid is resumed, a certain amount of absorption liquid relatively rich in refrigerant will pass from the upper part of vessel 43 into the active portion of the absorption liquid circuit when pumping is started following a shut-down period. When absorption liquid again flows into conduit section 28a from coil 29 and an equilibrium condition is established, the liquid levels in the conduit section 28a and the vessel 43 will be essentially the same due to the free liquid communication therebetween and the fact that the upper ends of the conduits 28 and 30 are in communication with one another at point 67. In view of the foregoing, it will be understood that the vessel 43 comprises top and bottom rigid wall means and upstanding rigid side wall means therebetween which provides a single vertically extending space for holding the body of liquid in the vessel. The vessel 43, having a major vertical axis, forms a component of the hermetically sealed refrigeration apparatus with the space therein having a constant volume with changes in operating conditions under which the apparatus operates which includes changes in temperature of ambient air.

In order to effect defrosting of cooling unit 18, vapor expelled from generator 20 and at an elevated temperature is conducted therefrom to cooling unit 18 in a path of flow which functions as a by-pass passage around the condenser 25 and includes conduits 68 and 69. As shown in FIG. 1, the upper end of conduit 69 is connected to the connection 58 through which inert gas flows from the low temperature evaporator section 18a to the higher temperature evaporator section 18b. When hot vapor is being diverted from the vapor supply line 23 into conduits 68 and 69 for flow to the cooling unit 18, hot expelled vapor will flow through the by-pass passage directly to the cooling unit when defrosting is being effected. This is so because the upper part of the liquid column in passage 33 between the outer and inner pipes 35 and 36, respectively, will be effective to block flow of expelled vapor through the upwardly inclined connection 37 into the standpipe 38. When hot vapor is supplied to the cooling unit 18 directly from the generator 20, the temperature of the cooling unit 18 will be increased and melt frost accumulated thereon.

The conduit 68 forms one leg of an inverted U-shaped pipe 70 having an upper closed end at the vicinity of the openings 49 in the pipe 36. The upper end of the pipe 35 forms the other leg or arm of the inverted U-shaped pipe 70. The conduit 68 forms one leg of a U-shaped liquid trap 71, the other leg of which is formed by one arm 72a of an inverted U-shaped conduit 72 having its other arm 72b depending downward below the lower end of the arm 72a and connected at 73 to the passage 33 formed between the outer and inner pipes 35 and 36, respectively. The lower end of conduit 69 is connected to the conduit 68 at a point 74 which is above the lower closed end of the conduit 68 and above the point 75 at which the lower end of the arm 72a is connected to the conduit 68. The conduits 69 and 68 form a liquid trap 76 which, when liquid collects therein, blocks flow of hot generator vapor through the by-pass passage to the cooling unit 18.

When liquid is removed from the trap 76, in a manner that will be explained presently, it will be evident that inert gas, such as hydrogen, can pass by diffusion from the cooling unit 18 into the by-pass passage formed by the conduits 68 and 69. Further, hot generated vapor flows through the openings 49 in the pipe 36 into the closed end of the inverted U-shaped pipe 70 and passes downwardly in the conduit 68. Since the temperature of the conduit 68 is lower than the temperature of the upper part of pipe 35 which forms the other leg of the inverted U-shaped pipe 70, the hot vapor will condense slowly in the conduit 68. The liquid condensate formed in the conduit 68 in this manner collects in the bottom part thereof. When the liquid in the conduit 68 rises above the point 74, at which the lower end of conduit 69 is connected to the conduit 68, the by-pass passage is closed by the liquid trap 76 and hot vapor from the generator 20 cannot flow through conduits 68 and 69 to the cooling unit 18.

The generator vapor continues to condense slowly in the conduit 68 and collects in the liquid trap 71 and conduit 69 until it reaches the overflow point 77 in arm 72a, at which time the liquid collected in the trap 71 will automatically flow therefrom by syphon action into arm 72b and flow therefrom at point 73 into the passage 33 between the outer and inner pipes 35 and 36, respectively. Since the liquid surface of the liquid column in the passage 33 is below the point 73 and above the point 50, the liquid removed from the liquid trap 71 will flow downward by gravity from the point 73 toward the top of the liquid column. All of the liquid in conduit 69 and U-shaped trap 72, except the small amount of liquid on conduit 68 below the point 75, is automatically removed in a single operation by syphon action, the removed liquid flowing into the passage 33 in the manner just explained.

With removal of liquid from conduit 69 and U-shaped trap 72, hot vapor from generator 20 can flow through the openings 49 in pipe 36 to the cooling unit 18 through the by-pass passage formed by the conduits 68 and 69 so as to melt frost accumulated on the cooling unit 18. When hot vapor from the generator 20 flows through conduit 69, condensation also takes place therein. The conduit 69 slopes downward to the point 74 at which it is connected to the conduit 68, so that condensate formed in the conduit 69 will drain by gravity into the conduit 68 and collect therein.

The quantity of liquid removed from the liquid trap 71 into the passage 33 by syphon action is such that the height of the liquid column in the passage 33 will remain below the point 73, as explained above. Hence, the removal of liquid from the trap 71 will not affect the flow of hot generator vapor through the openings 49 into the closed end of the inverted U-shaped pipe 70.

Since the by-pass passage is provided between the region at which the hot vapor is generated and the analyzer 51, a path of flow for hot vapor is provided through conduits 68 and 69 to cooling unit 18 which offers less resistance to flow than that offered by the path of flow to the condenser 25. Therefore, the back pressure developed in the conduit 68 during defrosting will be less than the pressure developed therein during normal operation of the refrigeration system, whereby the liquid accumulated in the pipe 36 will tend to rise and weak absorption liquid will overflow through at least the bottom opening 49 and flow into the passage 33 between the outer and inner pipes 35 and 36, respectively, instead of flowing to the upper part of the absorber 29. During defrosting, circulation of inert gas through and between the cooling unit 18 and absorber coil 29 stops. This in turn stops evaporation of refrigerant into inert gas in the cooling unit 18 and renders the latter inoperative to effect cooling.

It will now be understood that in the defrosting arrangement described and shown in FIG. 4, a by-pass passage is provided which enables hot generated vapor to by-pass the condenser and flow to the cooling unit 18 to melt frost and ice accumulated thereon. The by-pass passage includes a liquid trap having a pair of upstanding legs through which the hot generated vapor can flow when the liquid trap is depleted of liquid. In addition to forming a liquid seal, the trap includes another upstanding leg which forms an arm of a syphon for automatically removing liquid intermittently from the trap. When the trap is depleted of liquid, condensate collects therein for a first interval of time until a liquid seal is formed in the hot vapor by-pass passage, such first interval of time determining the length of the defrosting period. Condensate continues to collect in the trap until a sufficient quantity of liquid is accumulated for the syphon to function to remove liquid from the trap and withdraw such liquid from a region of the by-pass passage which is intermediate the ends thereof. It will now be evident that the accumulation of liquid condensate in a single trap determines not only the length of the defrosting periods but also the interval of time between defrosting periods.

As explained above, the operating conditions under which the vapor-liquid lift pump operates change when normal operation of the refrigeration system terminates and hot vapor from the generator 20 flows to the cooling unit 18 so as to melt frost accumulated thereon. The upper part 49a of the pipe 36, at the region of the openings 49 therein, serves as a gas separation chamber. During normal operation of the refrigeration system, vapor separated from the raised liquid passes from the chamber 49a through the openings 49 into the outer pipe 35, and absorption liquid weak in refrigerant passes downward in a normal manner in the inner pipe 36 and flows to the absorber coil 29. Under these operating conditions of the pump pipe 40, the pressure in the gas separation chamber 49a is transmitted through the openings 49 into the closed end 70 of the inverted U-shaped pipe of which the upper part of the pipe 35 forms one arm thereof. In view of the location of the analyzer 51 and its connection at 50 to the pipe 35, the resistance to flow of generator vapor is such that the gas pressure in the gas separation chamber 49a will be of sufficient magnitude to maintain the liquid surface in the pipe 36 at the level A and cause flow of liquid to the upper end of the absorber coil 29 at the level B.

When the trap 76 is depleted of liquid, hot generator vapor can flow therethrough and conduit 69 to the cooling unit 18 to effect defrosting. When this occurs, the conditions under which the pump operates change. During defrosting, the pressure in the gas separation chamber 49a is less than the pressure developed therein during normal operation due to the fact that less resistance is offered to flow of hot vapor to cooling unit 18 in the by-pass passage formed by the conduits 68 and 69. Under these changed operating conditions of the pump, the liquid surface level of the column of liquid in conduit 36 rises and weak absorption liquid overflows from the upper part of conduit 36 through the openings 49 therein into the passage 33 between the inner and outer pipes 36 and 35, respectively. With this arrangement, absorption liquid weak in refrigerant is diverted from its normal path of flow to the absorber coil 29 and is directed to a part of the path of flow for absorption liquid which is rich in refrigerant and conducted from absorber coil 29 to the generator 20. This stops circulation of absorption liquid in the gas circuit in the same manner that absorption liquid circulation stops when the heat supplied to the generator 20 is shut off, and will cause liquid to be transferred from the absorption liquid circuit through the pipe section 35a into the vessel 43. When the defrosting operation terminates, the operating conditions for the pump 40 change back to normal and normal circulation of absorption liquid resumes. By reason of this change in the operating conditions of the pump 40, whereby normal circulation of absorption liquid in its circuit is resumed, liquid in the vessel 43 will be transferred to conduit section 28a through the pipe section 35a. Accordingly, transfer of liquid to the vessel 43 from the lower end of conduit section 28a and transfer of liquid from the vessel 43 to the lower end of conduit section 28a is effected solely by a change in conditions under which the pump 40 operates.

In FIG. 8 I have shown a modification of the invention which differs from the embodiment shown in FIGS. 2 and 4 and described above. In FIG. 8 the conduit 52' for conducting uncondensed refrigerant from the outlet end of the condenser 25 is connected at its lower end to the vessel 43 at a region above the liquid surface level 43b therein, whereby uncondensed refrigerant can flow into the vapor space 43a of the vessel and displace a mixture of refrigerant vapor and inert gas therefrom. The displaced inert gas in the mixture becomes effective to increase the total pressure in the system, so that an adequate condensing pressure will be obtained in the condenser 25 for the prevailing temperature of the ambient air. The gas space 43a in the vessel 43 can be made larger, if desired, by increasing the overall height of the vessel.

The parts of the refrigeration apparatus described above, whose relative positions are substantially fixed, usually are formed of iron or steel when ammonia and water are employed as the refrigerant and liquid absorbent, respectively. Hence, the piping for the cooling unit 18, which is connected by conduits 27 and 31 to other parts of the refrigeration apparatus, forms a unitary component thereof and is formed of such ferrous metal. As shown in FIGS. 1 and 6, the conduits 32 and 59 and portions of the conduits 26, 27, 31, 58 and 69 are embedded in thermal insulation 14a retained in the removable wall section 53 which is carried by the refrigeration apparatus and forms a unitary part thereof. When the refrigeration apparatus is mounted on the cabinet 10 in any suitable manner (not shown) and the removable wall section 53 is positioned in the rear wall opening 54 with the plate 53a bearing against the outer surface of the rear insulated wall 55, the low and higher temperature evaporator sections 18a and 18b are positioned in the interior of the refrigerator cabinet. Thereafter, the casing 15 is inserted into the interior of the cabinet 10 through the top front opening and its bottom is heat conductively connected in any suitable manner to the low temperature evaporator section 18a.

With the evaporator unit 18 in place in the interior of the cabinet 10, the other components of the refrigeration apparatus are disposed in a vertically extending apparatus space 80 at the rear of the cabinet which is defined by the rear portions 12a of the lateral side walls of the outer shell 12, which project rearward beyond the rear insulated wall 55; and by the rear portion 12b of the top of the outer shell 12, which also projects beyond the rear insulated wall 55 and is apertured at 81. Natural draft is produced in the space 80 and causes upward circulation of ambient air due to heat radiated by the absorber coil 29 and condenser 25, so that surrounding cool air can flow directly over their surfaces and assure adequate cooling of these parts. The bottom of the space 80 is open and the top is apertured at 81, as just explained, to enable air to freely flow upward in the space 80.

The absorber coil 29 comprises piping in the form of a looped coil having straight sections 82 disposed in spaced apart vertical planes and connecting bends 83. The straight pipe sections 82 slope downward for absorption liquid to flow downward by gravity through the looped coil. The looped coil alone functions as the absorber 29 and no fins or heat dissipating surfaces are fixed to the straight sections 82. The straight pipe sections 82 in the spaced apart vertical planes form inner and outer banks 82a and 82b, respectively, in each of which the straight pipe sections are disposed one above another.

In order that the depth D of the apparatus space 80 will be at a minimum when the refrigerator is positioned against a wall 84 in a dwelling with the apparatus space 80 closely adjacent to the wall, the important components of the generator 20 are in the same vertical plane parallel to and between the inner and outer planes $P_1$ and $P_2$, respectively, of the inner and outer banks 82a and 82b of the straight pipe sections 82. In the preferred embodiment of the invention illustrated, the important components of the generator 20 include the pipes 35, 38 and 68 which, as shown in FIGS. 3 and 6, are in alignment with a vertical plane $P_3$. As will be evident from FIGS. 3 and 6, the pipes 35, 38 and 68 and all of the other pipes in the absorption liquid circuit, which include the pipes 28a and 30, are disposed between the innermost and outermost vertical planes $P_1$ and $P_2$ of the absorber coil 29.

In order that the absorber coil 29 will be cooled efficiently by natural draft circulation of air in the apparatus compartment 80, a gap 85 is provided between the rear insulated wall 55 and the innermost plane $P_1$ of the absorber coil. For the same reason, it is usually desirable to provide a gap 86 between the outermost plane $P_2$ of the absorber coil 29 and the wall 84 against which the refrigerator is positioned, as shown in FIG. 1.

The generator casing 45, within which the insulation 44 is retained, is rectangular in shape with its long or major axis L—L parallel to the planes $P_1$ and $P_2$ of the absorber coil 29, and its shorter or minor axis S—S perpendicular to the planes $P_1$ and $P_2$. As seen in FIG. 3, the major axis L—L of the generator 20 coincides with the plane $P_3$ in which the aligned pipes 35, 38 and 68 are disposed. Since the generator 20 is located adjacent to the rear portion 12a of one of the lateral side walls of the outer shell 12 and out of the path of flow for air in the apparatus space 80, the rear wall or face 20a of the generator 20 can project rearward beyond the outermost plane $P_2$ of the absorber coil 29 and bridge at least a part of the gap between the plane $P_2$ of the absorber coil and the wall 84.

The pump pipe 40, which is the hottest component of the generator 20 during operation of the refrigeration system, desirably is located at the center of the body of thermal insulation 44 in which it is embedded. The pipes 35, 38, 68 and connection 37 may be located laterally of the pump pipe 40 and removed from the center of the body of thermal insulation 44 because these last-mentioned parts are at a lower temperature than the pump pipe 40 during operation of the refrigeration system.

In FIG. 7 I have shown a modification of the invention in which the generator 120 is elliptical in horizontal cross-section with its long or major axis L'—L' parallel to the innermost and outermost planes $P_1$ and $P_2$ of the absorber coil and its short or minor axis S'—S' perpendicular to the rear insulated wall 55 of the cabinet 10. In FIG. 7 the pump pipe 40 desirably is located in the center of the body of thermal insulation 44' and the other components or pipes of the generator are between the pump pipe 40 and the casing 45' of the generator 120. Also, the inner and outer sides of the generator 120 are disposed in the same vertical plane as the innermost and outermost planes $P_1$ and $P_2$ of the absorber coil 29. The rear insulated wall 55 of the cabinet 10 may be formed with a depressed region or cavity 87 opposite the inner bank 82a of the absorber coil 29 to enable the innermost plane $P_1$ of the absorber coil 29 to be positioned in the plane of the rear face of the thermally insulated wall 55 at those parts thereof which are adjacent to and disposed about the cavity 87. The cavity 87 provides the gap 85' at the inner bank 82a of the absorber coil. Since walls of dwellings are usually provided with molding strips to conceal from view the joint between the bottom of the wall and the floor, a gap will always be formed between the outer plane $P_2$ of the absorber coil 29 and the wall. With the parts of the refrigeration system related to one another in the manner just described and shown in FIG. 7, the overall depth D of the apparatus space 80 will occupy a minimum amount of space between the rear insulated wall 55 of the cabinet 10 and the wall against which it is positioned.

Modifications of the embodiments of the invention which I have described and illustrated will occur to those skilled in the art, so that I do not desire to be limited to the particular arrangements set forth. Therefore, I intend in the claims to cover all those modifications and features which do not depart from the spirit and scope of my invention.

I claim:

1. Air-cooled hermetically sealed absorption refrigeration apparatus of the inert gas type comprising an absorption solution circuit including an absorber and a generator having a vapor-liquid lift pump to which heat is applied, said absorber comprising piping providing an elongated path of flow for absorption solution having an inlet at one level and an outlet at a lower level for gravity flow of absorption solution therethrough and forming the primary region in which refrigerant vapor is absorbed into solution during normal operation of the refrigeration apparatus, a vessel for holding a body of liquid in liquid communication with liquid in the absorption liquid circuit, said vessel comprising top and bottom rigid wall means and upstanding rigid side wall means therebetween which provides a single vertically extending space for holding the body of liquid in said vessel, said vessel having a major vertical axis and forming a component of said hermetically sealed refrigeration apparatus with said space therein having a constant volume with changes in operating conditions under which the apparatus operates which includes changes in temperature of ambient air, means operable to effect distribution of absorption solution and refrigerant in the apparatus in accordance with change in operating conditions under which the apparatus operates which includes change in temperature of ambient air, effecting such distribution of absorption solution at least in part by transferring absorption solution between said vessel and said absorption solution circuit solely by changes in the operating condition of the vapor-liquid lift pump, an inert gas circuit for circulation of inert gas, said inert gas circuit including an evaporator and said absorber piping and said absorption solution circuit including said absorber piping and said generator, and means for connecting said vessel to at least one of said circuits, said connecting means functioning to position said vessel laterally with respect to said one circuit with said vessel serving as a dead-end branch for holding therein the body of liquid which includes absorption liquid and refrigerant.

2. Apparatus as set forth in claim 1 which includes means for conducting unevaporated refrigerant from said evaporator to said space of said vessel at a point above the liquid surface level of the body of liquid therein.

3. Apparatus as set forth in claim 2 which includes a condenser and a supply line for flowing condensed refrigerant from said condenser to said evaporator, and conduit means for conducting uncondensed refrigerant from the outlet end of said condenser to said space of said vessel at a point above the liquid surface level of the body of liquid therein.

4. A household refrigerator comprising a cabinet having a thermally insulated interior defined in part by a rear insulated wall and formed with a front access opening having closure means therefor, said cabinet including an outer shell having lateral side walls including portions projecting rearward from said rear insulated wall, a vertical apparatus space at the rear of said cabinet which is defined in part by the outer face of said rear insulated wall and the rearward projecting portions of said lateral side walls, the outer face of said rear insulated wall being disposed in a first inner vertical plane of said apparatus space, said lateral side walls of said outer shell which project rearward from said insulated wall having vertically disposed outer free ends, said outer free ends of said lateral side walls being disposed in a second outer vertical plane parallel to said first inner vertical plane, absorption refrigeration apparatus of the inert gas type including an evaporator and a plurality of parts including a condenser, an absorber, generator, and piping including a liquid heat exchanger connecting said absorber and said generator, means for mounting said apparatus on said cabinet to render said evaporator operable to function to cool the interior of said cabinet and to position said parts in said apparatus space with the outermost portions of said generator and said absorber substantially at regions through which said second outer vertical plane passes.

5. Apparatus as set forth in claim 4 in which said generator comprises a plurality of vertical pipes forming major components of the refrigeration apparatus, a body of thermal insulation, means for retaining said last-mentioned pipes in said body of thermal insulation and in alignment with one another in a vertical plane substantially parallel to said first inner vertical plane at said outer face of said rear insulated wall of said thermally insulated interior.

6. Apparatus as set forth in claim 5 in which said body of thermal insulation of said generator is retained in a shell having a horizontal cross-section of rectangular form with its major axis in a vertical plane which is parallel to said first and second inner and outer vertical planes and tangent to the outermost portion of said absorber.

7. Apparatus as set forth in claim 5 in which said body of thermal insulation of said generator is retained in a shell having a horizontal cross-section of elliptical form with its major axis in a vertical plane which is parallel to said first and second inner and outer vertical planes and tangent to the outermost portion of said absorber.

8. Apparatus as set forth in claim 5 in which said absorber comprises a looped coil having straight sections and connecting bends, said straight sections defining inner and outer banks having innermost and outermost vertical planes, respectively, and said insulation retaining means comprising a shell having its rearwardmost side in a vertical plane which is substantially within the vicinity of the outermost vertical plane of said absorber.

9. Apparatus as set forth in claim 1 in which at least a portion of said absorber piping is disposed at a higher level than said vessel and said absorption solution circuit includes additional piping connecting the outlet of said absorber piping and said vapor-liquid lift pump, and said means connecting said vessel to one of said circuits comprises conduit means having one end thereof connected to said vessel below the liquid surface level of the body of liquid therein and having the other end thereof connected to said additional piping connecting the outlet of said absorber piping and said vapor-liquid lift pump.

10. Apparatus as set forth in claim 9 which includes means connecting said gas circuit and said vessel at a region of said space above the liquid surface of the body of liquid therein, said last-mentioned connecting means functioning to provide communication between said space and said gas circuit substantially without any exchange of gas between said inert gas circuit and said space when inert gas circulates between said evaporator and said absorber piping during normal operation of the refrigeration apparatus.

References Cited
UNITED STATES PATENTS

| | | | |
|---|---|---|---|
| 1,822,224 | 9/1931 | Knight | 62—103 |
| 2,178,561 | 11/1939 | Coons | 62—105 |
| 2,794,331 | 6/1957 | Kogel | 62—148 X |
| 3,138,938 | 6/1964 | Beardslee | 62—141 |
| 3,141,307 | 7/1964 | Beardslee | 62—141 |
| 3,177,675 | 4/1965 | Kogel | 62—148 |

FOREIGN PATENTS

| | | |
|---|---|---|
| 207,339 | 4/1957 | Australia. |

LLOYD L. KING, *Primary Examiner.*